United States Patent
Kwon et al.

(10) Patent No.: US 11,564,275 B2
(45) Date of Patent: Jan. 24, 2023

(54) METHOD AND APPARATUS FOR MULTI-LINK COMMUNICATIONS

(71) Applicant: NXP USA, Inc., Austin, TX (US)

(72) Inventors: Young Hoon Kwon, Laguna Niguel, CA (US); Liwen Chu, San Ramon, CA (US); Hongyuan Zhang, Fremont, CA (US)

(73) Assignee: NXP USA, Inc., Austin, TX (US)

( * ) Notice: Subject to any disclaimer, the term of this patent is extended or adjusted under 35 U.S.C. 154(b) by 6 days.

(21) Appl. No.: 17/206,885

(22) Filed: Mar. 19, 2021

(65) Prior Publication Data

US 2021/0298102 A1    Sep. 23, 2021

Related U.S. Application Data

(60) Provisional application No. 62/992,055, filed on Mar. 19, 2020, provisional application No. 63/009,034, filed on Apr. 13, 2020, provisional application No. 63/137,202, filed on Jan. 14, 2021.

(51) Int. Cl.
| | |
|---|---|
| H04W 4/00 | (2018.01) |
| H04W 76/15 | (2018.01) |
| H04W 48/08 | (2009.01) |
| H04W 76/11 | (2018.01) |

(52) U.S. Cl.
CPC .......... *H04W 76/15* (2018.02); *H04W 48/08* (2013.01); *H04W 76/11* (2018.02)

(58) Field of Classification Search
CPC ..... H04W 76/15; H04W 48/08; H04W 76/11; H04W 48/12; H04W 84/12; H04W 16/02
USPC ......................................... 370/328, 329, 330
See application file for complete search history.

(56) References Cited

U.S. PATENT DOCUMENTS

| | | | | |
|---|---|---|---|---|
| 2019/0335454 | A1* | 10/2019 | Huang | H04W 88/085 |
| 2020/0396568 | A1* | 12/2020 | Huang | H04W 76/40 |
| 2021/0007168 | A1* | 1/2021 | Asterjadhi | H04W 52/0235 |
| 2021/0029588 | A1* | 1/2021 | Cariou | H04W 28/0263 |
| 2021/0037583 | A1* | 2/2021 | Seok | H04W 76/15 |
| 2021/0120599 | A1* | 4/2021 | Cariou | H04W 76/15 |
| 2021/0282047 | A1* | 9/2021 | Cherian | H04W 4/80 |
| 2021/0282229 | A1* | 9/2021 | Stacey | H04W 48/16 |
| 2022/0132423 | A1* | 4/2022 | Fang | H04W 28/06 |

OTHER PUBLICATIONS

Institute of Electrical and Electronics Engineers (IEEE), "Multi-Link TIM", IEEE 802.11-20/0066r1, Jan. 2020, 14 pgs.
Institute of Electrical and Electronics Engineers (IEEE), "10.55 Group AID", IEEE P802.11-REVmd/D3.1, Feb. 2020, 2 pgs.

\* cited by examiner

*Primary Examiner* — Chuong T Ho

(57) ABSTRACT

Embodiments of a method and an apparatus for multi-link communications are disclosed. In an embodiment, a method for multi-link communications involves associating, by an access point (AP) multi-link device (MLD), with a non-AP MLD operating on a first set of links, and allocating, by the AP MLD, an Association ID (AID) to the non-AP MLD, such that the AID is included in a first plurality of AIDs, wherein the first plurality of AIDs does not include a first set of AIDs, and wherein at least one of the first set of AIDs are assigned to at least one of APs and Basic Service Set Identifiers (BSSIDs) on a second set of links.

20 Claims, 6 Drawing Sheets

| | 0 | 1 | 2 | 3 | 4 | 5 | 6 | 7 | 8 | ... |
|---|---|---|---|---|---|---|---|---|---|---|
| AP11 TIM | AP11 | AP12 | AP22 | AP21 | AP31 | | | | | |
| AP21 TIM | AP21 | AP22 | AP23 | AP24 | AP12 | AP31 | AP11 | | | |
| AP31 TIM | AP31 | AP32 | AP33 | 0 | AP12 | AP21 | | | | |

METHOD AND APPARATUS FOR MULTI-LINK COMMUNICATIONS

CROSS-REFERENCE TO RELATED APPLICATIONS

This application is entitled to the benefit of U.S. Provisional Patent Application Ser. No. 62/992,055, filed on Mar. 19, 2020, and U.S. Provisional Patent Application Ser. No. 63/009,034, filed on Apr. 13, 2020, and U.S. Provisional Patent Application Ser. No. 63/137,202, filed on Jan. 14, 2021, each of which is incorporated by reference herein.

BACKGROUND

In multi-link communications, wireless devices, e.g., access point (AP) multi-link devices (MLDs), can buffer data and transmit buffered data to non-AP MLDs, e.g., station (STA) MLDs, through one or more communication links. For example, certain APs of a wireless AP MLD may wirelessly transmit buffered data to one or more wireless STAs of a non-AP MLD through one or more wireless communication links, whereas other APs of the wireless AP MLD may not transmit buffered data. To facilitate the proper transmission of buffered data between APs of the AP MLD and corresponding STAs of the non-AP MLD, an indication is needed to identify which communication links (used by APs of the AP MLD and corresponding STAs of the non-AP MLD) have buffered data. However, typical multi-link communications technology may not be able to efficiently identify communication links with buffered data. Therefore, there is a need for multi-link communications technology that can efficiently indicate which communication links have buffered data.

SUMMARY

Embodiments of a method and an apparatus for multi-link communications are disclosed. In an embodiment, a method for multi-link communications involves associating, by an access point (AP) multi-link device (MLD), with a non-AP MLD operating on a first set of links, and allocating, by the AP MLD, an Association ID (AID) to the non-AP MLD, such that the AID is included in a first plurality of AIDs, wherein the first plurality of AIDs does not include a first set of AIDs, and wherein at least one of the first set of AIDs are assigned to at least one of APs and Basic Service Set Identifiers (BSSIDs) on a second set of links.

In an embodiment, the second set of links are the same as the first set of links.

In an embodiment, the second set of links are a set of links on which the AP MLD is operating.

In an embodiment, a set of bits in a Traffic Indication Map (TIM) element transmitted in a management frame from an AP affiliated with the AP MLD on a first link corresponds to the first set of AIDs, and wherein the first set of AIDs are assigned to APs corresponding to a non-transmitted BSSID and APs affiliated with the AP MLD on at least one link that is not the first link.

In an embodiment, AIDs assigned to at least one non-AP MLD are unique and set to a value greater than at least $2^n$, and wherein n is a maximum value of log 2 (maximum possible number of BSSIDs) amongst multiple BSSID sets operating on each link of the AP MLD.

In an embodiment, an AP affiliated with the AP MLD explicitly indicates information that identifies which AID is assigned for each AP affiliated with the AP MLD in a management frame.

In an embodiment, the management frame includes a Multi-Link (ML) element to indicate the AID for each AP affiliated with the AP MLD.

In an embodiment, a first field is defined in a Common Info field of a Basic variant ML element to indicate information for AIDs that correspond to each AP affiliated with the AP MLD.

In an embodiment, the management frame includes a Reduced Neighbor Report (RNR) element to indicate the AID for each AP affiliated with the AP MLD.

In an embodiment, an AP affiliated with the AP MLD implicitly indicates information that identifies which AID is assigned for each AP affiliated with the AP MLD in a management frame.

In an embodiment, a set of bits in a TIM element transmitted in the management frame correspond to a predetermined range of AIDs and indicate which APs affiliated with the AP MLD have buffered group addressed frames.

In an embodiment, the AP corresponds to at least one of not part of a multiple BSSID set and part of the multiple BSSID set which is a transmitted BSSID, and wherein the AP indicates which APs affiliated with the AP MLD have buffered group addressed frames via a set of contiguous bits in a Partial Virtual Bitmap field of the TIM element after a last bit corresponding to a non-transmitted BSSID that is in the same multiple BSSID as the AP.

In an embodiment, the AP corresponds to a non-transmitted BSSID in a multiple BSSID set, and wherein another AP corresponding to a transmitted BSSID in the same multiple BSSID set indicates which APs in the same AP MLD as the AP have buffered group addressed frames via a set of contiguous bits in a Partial Virtual Bitmap field of the TIM element after a last bit corresponding to the non-transmitted BSSID that is in the same multiple BSSID as the AP.

In an embodiment, a first AP affiliated with the AP MLD is not part of a multiple BSSID, and wherein AIDs [1, N] are assigned to APs affiliated with the AP MLD and which do not include the first AP.

In an embodiment, a first AP affiliated with the AP MLD is operating on a first link and corresponds to a transmitted BSSID in a multiple BSSID set, and wherein AIDs $[1, 2^n-1]$ are assigned to APs corresponding to non-transmitted BSSID operating on the first link and AIDs $[2^n, 2^n+N]$ are assigned to APs affiliated with the AP MLD and which do not include the first AP.

In an embodiment, a second AP affiliated with a second AP MLD is operating on the first link and corresponds to a non-transmitted BSSID in the multiple BSSID set, and wherein AIDs $[2^n+N+1, 2^n+N+M]$ are assigned to APs affiliated with the second AP MLD and which do not include the second AP.

In an embodiment, an AP affiliated with the AP MLD corresponds to at least one of not part of a multiple BSSID set and part of the multiple BSSID set which is a transmitted BSSID, wherein the AP indicates which other APs in the same AP MLD have buffered group addressed frames via a set of bits in a Partial Virtual Bitmap field of a TIM element after a last bit corresponding to a non-transmitted BSSID in the same multiple BSSID as the AP, and wherein the AP transmits a Delivery TIM (DTIM) Beacon that includes the indication which is based on information corresponding to other APs that the AP has when the AP schedules the DTIM Beacon.

In an embodiment, an AP affiliated with the AP MLD corresponds to a non-transmitted BSSID in a multiple BSSID set, wherein the AP corresponds to a transmitted BSSID in the same multiple BSSID set that indicates which other APs in the same AP MLD as the non-transmitted BSSID have buffered group addressed frames via a set of bits in a Partial Virtual Bitmap field of a TIM element after a last bit corresponding to a non-transmitted BSSID in the same multiple BSSID as the AP, and wherein the AP that corresponds to the transmitted BSSID of the same multiple BSSID set as the non-transmitted BSSID transmits a DTIM Beacon that includes the indication corresponding to the non-transmitted BSSID and which is based on information corresponding to other APs that the transmitted BSSID has when the AP schedules the DTIM Beacon.

In an embodiment, the AP MLD and the non-AP MLD are compatible with an Institute of Electrical and Electronics Engineers (IEEE) 802.11 protocol.

An embodiment of an AP MLD is also disclosed. The AP MLD includes a processor configured to associate with a non-AP MLD operating on a first set of links, and allocate an AID to the non-AP MLD, such that the AID is included in a first plurality of AIDs, wherein the first plurality of AIDs does not include a first set of AIDs, and wherein at least one of the first set of AIDs are assigned to at least one of APs and BSSIDs on a second set of links.

Other aspects in accordance with the invention will become apparent from the following detailed description, taken in conjunction with the accompanying drawings, illustrated by way of example of the principles of the invention.

BRIEF DESCRIPTION OF THE DRAWINGS

FIG. 4B is a table that represents AID assignment for an operation example of allocating AIDs using an AID range for a non-AP MLD in accordance with an embodiment of the invention.

Throughout the description, similar reference numbers may be used to identify similar elements.

DETAILED DESCRIPTION

Figure 1:
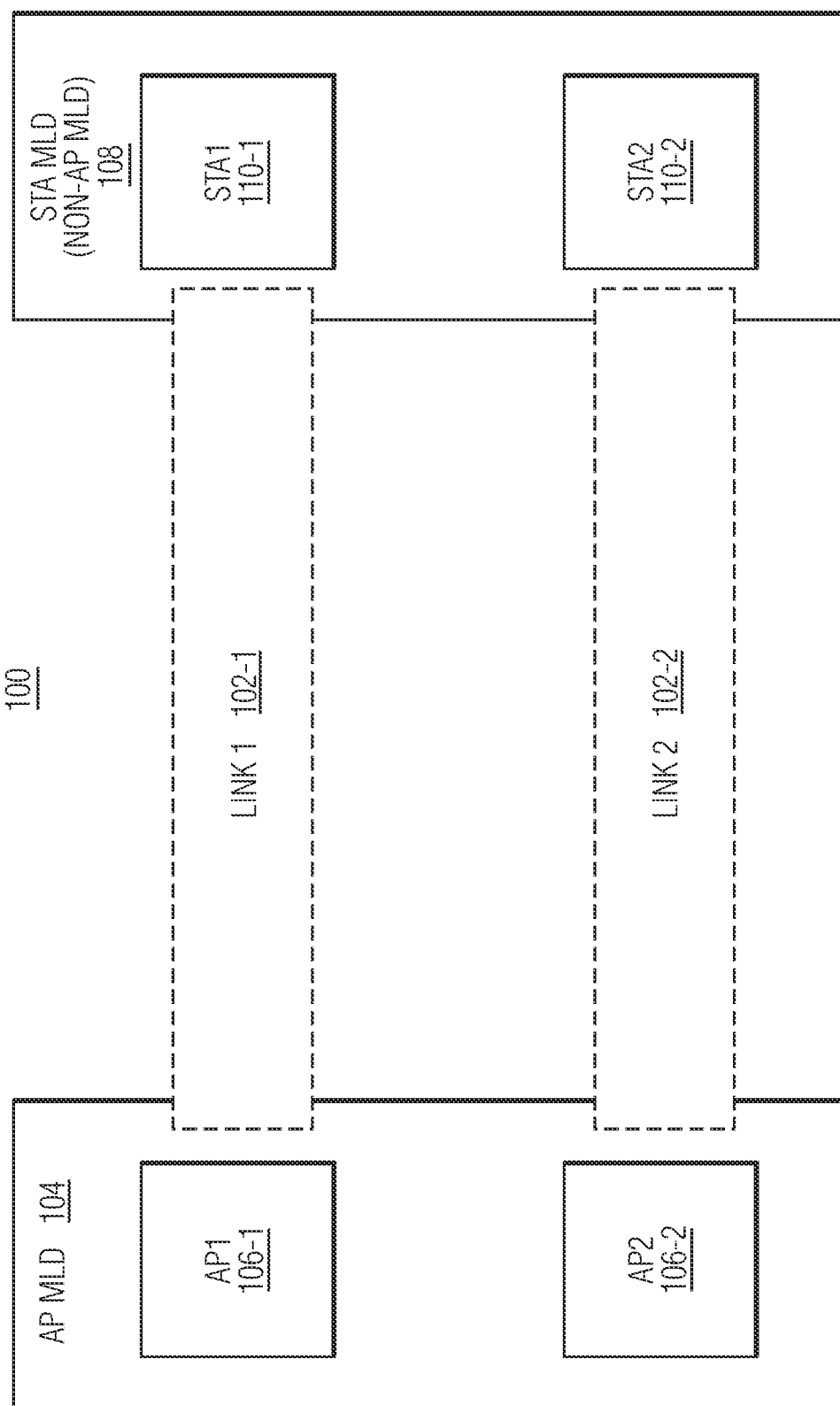
FIG. 1 depicts a multi-link communications system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

In embodiments of a wireless communications system, an access point (AP) affiliated with an AP multi-link device (MLD) (e.g., wireless device) of a wireless local area network (WLAN) transmits data to at least one associated non-AP stations (STA) affiliated with a non-AP STA MLD, e.g., a STA MLD. The AP MLD is configured to operate with associated non-AP MLDs according to a communication protocol. For example, the communication protocol may be an Extremely High Throughput (EHT) communication protocol, or Institute of Electrical and Electronics Engineers (IEEE) 802.11be communication protocol. Features of wireless communications and multi-link communication systems operating in accordance with the EHT communication protocol and/or next-generation communication protocols may be referred to herein as "non-legacy" features. In some embodiments of the wireless communications system described herein, different associated STAs within range of an AP operating according to the EHT communication protocol are configured to operate according to at least one other communication protocol, which defines operation in a Basic Service Set (BSS) with the AP, but are generally affiliated with lower data throughput protocols. The lower data throughput communication protocols (e.g., IEEE 802.11n, IEEE 802.11ac, IEEE 802.11ax, etc.) may be collectively referred to herein as "legacy" communication protocols.

FIG. 1 depicts a multi-link communications system 100 that is used for wireless (e.g., WiFi) communications. In the embodiment depicted in FIG. 1, the multi-link communications system includes one AP multi-link device, which is implemented as AP MLD 104, and one non-AP STA multi-link device, which is implemented as STA MLD 108. The multi-link communications system can be used in various applications, such as industrial applications, medical applications, computer applications, and/or consumer or enterprise applications. In some embodiments, the multi-link communications system is a wireless communications system, such as a wireless communications system compatible with an IEEE 802.11 protocol. For example, the multi-link communications system may be a wireless communications system compatible with the IEEE 802.11be protocol. Although the depicted multi-link communications system 100 is shown in FIG. 1 with certain components and described with certain functionality herein, other embodiments of the multi-link communications system may include fewer or more components to implement the same, less, or more functionality. For example, in some embodiments, the multi-link communications system includes multiple AP MLDs with one STA MLD, or multiple AP MLDs with more than one STA MLD. In another example, although the multi-link communications system is shown in FIG. 1 as being connected in a certain topology, the network topology of the multi-link communications system is not limited to the topology shown in FIG. 1. Although the system described with reference to FIG. 1 involves multi-link communications, the techniques described herein are also applicable to single-link communications. Furthermore, the techniques described herein may also be applicable to each link of a multi-link communications system.

In the embodiment depicted in FIG. 1, the AP MLD 104 includes two radios, implemented as access points (APs) 106-1 and 106-2. In such an embodiment, the APs may be AP1 106-1 and AP2 106-2. In some embodiments, the AP MLD 104 implements upper layer Media Access Control (MAC) functionalities (e.g., block acknowledgement establishment, reordering of frames, etc.) and the APs 106-1 and 106-2 implement lower layer MAC functionalities (e.g., backoff, frame transmission, frame reception, etc.). The APs 106-1 and 106-2 may be implemented in hardware (e.g., circuits), software, firmware, or a combination thereof. The APs 106-1 and 106-2 may be fully or partially implemented as an integrated circuit (IC) device. In some embodiments, the APs 106-1 and 106-2 are wireless APs compatible with at least one WLAN communications protocol (e.g., at least one IEEE 802.11 protocol). For example, the APs 106-1 and 106-2 may be wireless APs compatible with the IEEE 802.11be protocol. In some embodiments, an AP is a wireless AP that connects to a local area network (e.g., a LAN) and/or to a backbone network (e.g., the Internet) through a wired connection and that wirelessly connects to wireless stations (STAs), for example, through one or more WLAN communications protocols, such as the IEEE 802.11 protocol. In some embodiments, an AP includes at least one antenna, at least one transceiver operably connected to the at least one antenna, and at least one controller operably connected to the corresponding transceiver. In some embodiments, the at least one transceiver includes a physical layer (PHY) device. The at least one controller may be configured to control the at least one transceiver to process received packets through the at least one antenna. In some embodiments, the at least one controller is implemented within a processor, such as a microcontroller, a host processor, a host, a digital signal processor (DSP), or a central processing unit (CPU), which can be integrated in a corresponding transceiver. In some embodiments, each of the APs 106-1 or 106-2 of the AP MLD 104 may operate in a different size BSS operating channel. For example, AP1 106-1 may operate in a 320 MHz BSS operating channel and AP2 106-2 may operate in a 160 MHz BSS operating channel. Although the AP MLD 104 is shown in FIG. 1 as including two APs, other embodiments of the AP MLD 104 may include more than two APs.

In the embodiment depicted in FIG. 1, the non-AP STA multi-link device, implemented as STA MLD 108, includes two radios which are implemented as non-AP STAs 110-1 and 110-2. In such an embodiment, the non-AP STAs may be STA1 110-1 and STA2 110-2. The STAs 110-1 and 110-2 may be implemented in hardware (e.g., circuits), software, firmware, or a combination thereof. The STAs 110-1 and 110-2 may be fully or partially implemented as an IC device. In some embodiments, the non-AP STAs 110-1 and 110-2 are part of the STA MLD 108, such that the STA MLD is a communications device that wirelessly connects to wireless APs. For example, the STA MLD 108 may be implemented in a laptop, a desktop personal computer (PC), a mobile phone, or other communications device that supports at least one WLAN communications protocol. In some embodiments, the non-AP STA MLD 108 is a communications device compatible with at least one IEEE 802.11 protocol (e.g., the IEEE 802.11be protocol). In some embodiments, the STA MLD 108 implements a common MAC data service interface and the non-AP STAs 110-1 and 110-2 implement a lower layer MAC data service interface. In some embodiments, the AP MLD 104 and/or the STA MLD 108 identifies which communication links support the multi-link operation during a multi-link operation setup phase and/or exchanges information regarding multi-link capabilities during the multi-link operation setup phase. In some embodiments, each of the non-AP STAs 110-1 and 110-2 of the STA MLD 108 may operate in a different frequency band. For example, the non-AP STA 110-1 may operate in the 2.4 GHz frequency band and the non-AP STA 110-2 may operate in the 5 GHz frequency band. In some embodiments, each STA includes at least one antenna, at least one transceiver operably connected to the at least one antenna, and at least one controller connected to the corresponding transceiver. In some embodiments, the at least one transceiver includes a PHY device. The at least one controller may be configured to control the at least one transceiver to process received packets through the at least one antenna. In some embodiments, the at least one controller is implemented within a processor, such as a microcontroller, a host processor, a host, a DSP, or a CPU, which can be integrated in a corresponding transceiver.

In the embodiment depicted in FIG. 1, the STA MLD 108 communicates with the AP MLD 104 via two communication links, e.g., link1 102-1 and link2 102-2. For example, each of the non-AP STAs 110-1 or 110-2 communicates with an AP 106-1 or 106-2 via corresponding communication links 102-1 or 102-2. In an embodiment, a communication link (e.g., link1 102-1 or link2 102-2) may include a BSS operating channel established by an AP (e.g., AP1 106-1 or AP2 106-2) that features multiple 20 MHz channels used to transmit frames (e.g., Physical Layer Protocol Data Units (PPDUs), Beacons, management frames, etc.) between a first wireless device (e.g., an AP) and a second wireless device (e.g., a STA). In some embodiments, a 20 MHz channel may be a punctured 20 MHz channel or an unpunctured 20 MHz channel. In some embodiments, the 20 MHz channels may be aggregated to form a subchannel (e.g., an 80 MHz subchannel or a 160 MHz subchannel). Although the STA MLD 108 is shown in FIG. 1 as including two non-AP STAs, other embodiments of the STA MLD 108 may include one non-AP STA or more than two non-AP STAs. In addition, although the AP MLD 104 communicates (e.g., wirelessly communicates) with the STA MLD 108 via multiple links 102-1 and 102-2, in other embodiments, the AP MLD 104 may communicate (e.g., wirelessly communicates) with the STA MLD 108 via one link or more than two communication links.

In a multi-link operation, an AP multi-link device (e.g., an AP MLD) typically broadcasts traffic indication map (TIM) information, where the TIM information includes buffered data information on one or more communication links. In some embodiments, a bit in a partial virtual bitmap of a TIM element that corresponds to a non-AP MLD may be set to one if individually addressed bufferable units (BUs) for the non-AP MLD are buffered by the AP MLD. Also, in a conventional TIM element, Bit 0 in the partial virtual bitmap of the TIM element may be defined such that Bit 0 of a Bitmap Control field contains a traffic indication virtual bitmap associated with Association ID (AID) 0. In some embodiments, Bit 0 in the partial virtual bitmap of the TIM element may be defined such that Bit 0 may be set to one in TIM elements with a Delivery TIM (DTIM) Count field set to zero when one or more group addressed MAC Service Data Units (MSDUs) or Management MAC Protocol Data Units (MMPDUs) are buffered at an AP (or a mesh STA) and are not to be delivered using a group AID as specified in the IEEE 802.11 standard. Therefore, for a TIM element transmitted from an AP affiliated with an AP MLD, there may be no indication available when one or more group addressed MSDUs or MMPDUs are buffered at another AP affiliated with the AP MLD.

In accordance with an embodiment of the invention, a technique for multi-link communications may involve associating, by an AP MLD, with a non-AP MLD operating on a first set of links, and allocating, by the AP MLD, an AID to the non-AP MLD, such that the AID is included in a first plurality of AIDs, wherein the first plurality of AIDs does not include a first set of AIDs, and wherein at least one of the first set of AIDs are assigned to at least one of APs and Basic Service Set Identifiers (BSSIDs) on a second set of links. In some embodiments, the second set of links may be the same as the first set of links. In some embodiments, the second set of links may be a set of links on which the AP MLD is operating. Thus, the invention may include techniques which enable components of multi-link communication systems to identify if group addressed BUs are buffered or not buffered for APs and/or BSSIDs. By identifying if group addressed BUs are buffered or not buffered for APs and/or BSSIDs, multi-link communications may be performed more efficiently.

In some embodiments, when one or more group addressed MSDUs or MMPDUs are buffered at an AP MLD, the AP MLD may send a broadcast frame with a first indication set to a specific value, such that the specific value indicates that one or more group addressed MSDUs or MMPDUs are buffered at the AP MLD. In such an embodiment, the size of the first indication may be 1-bit. In such an embodiment, the first indication may be included in a TIM element. In one embodiment, the first indication may be indicated in Bit 0 of a Bitmap Control field in the TIM element. In another embodiment, the first indication may be indicated in a bit that corresponds with a predetermined AID of a traffic indication bitmap in the TIM element. In some embodiments, the specific value may be one. In one embodiment, the first indication may be set to the specific value when a DTIM Count field in the TIM element is set to zero. In another embodiment, the first indication may be set to the specific value when the one or more group addressed MSDUs or MMPDUs are not to be delivered using a group AID. In another embodiment, the first indication may be set to the specific value when a buffered non-Groupcast with Retries Service Period (non-GCR-SP) addressed BUs that may be delivered using MPDUs with a Receiver Address (RA) other than a Synthetic Receiver Address (SYNRA), but which are not delivered using the group AID from an AP affiliated with the AP MLD. In some embodiments, the broadcast frame further includes a second indication to indicate if one or more group addressed MSDUs or MMPDUs are buffered at an AP that sends the broadcast frame. In such an embodiment, the second indication may be indicated in Bit 0 of the Bitmap Control field in the TIM element.

In some embodiments, when an AP MLD transmits a frame carrying a TIM element, a traffic indication virtual bitmap bit associated with AID 0 may be set to one when one or more group addressed MSDUs or MMPDUs are buffered at the AP MLD. In such an embodiment, the traffic indication virtual bitmap associated with AID 0 may be set to one when one or more group addressed MSDUs or MMPDUs are buffered at the AP MLD and are not to be delivered using a group AID. In some embodiments, Bit 0 of a Bitmap Control field may contain the traffic indication virtual bitmap bit associated with AID 0. In one embodiment, the traffic indication virtual bitmap bit may be set to one in the TIM element when a DTIM Count field in the TIM element is set to zero. In another embodiment, the traffic indication virtual bitmap bit may be set to zero in the TIM element when the DTIM Count field in the TIM element is set to a value other than zero. In some embodiments, when the AP MLD transmits the frame carrying the TIM element, AID 0 may be reserved to indicate the presence of buffered non-GCR-SP group addressed BUs that may be delivered using MPDUs with an RA other than a SYNRA, but that are not delivered using a group AID from an AP affiliated with the AP MLD. In some embodiments, the TIM element may be a modified TIM element (from a conventional TIM element) to support additional features of non-legacy communication protocols (e.g., the EHT communication protocol and next-generation communication protocols).

In some embodiments, when a traffic indication virtual bitmap associated with AID 0 is set to one, a separate element (or a separate field within a TIM element) may carry a second indication that indicates on which link(s) group addressed MSDUs or MMPDUs are buffered. In such an embodiment, the second indication may be a form of a bitmap, such that each bit in the bitmap represents a set of links on which the group addressed MSDUs or MMPDUs are buffered. In such an embodiment, the second indication may be composed of "N" bits, such that N is an integer of at least one. Furthermore, in such an embodiment, each state represented by N bits may indicate the set of links on which the group addressed MSDUs or MMPDUs are buffered, such that there can be up to "$2^N$" states available. As an example, a "state" may be N=3, such that each state may be composed of 3-bits that encode information and where each bit indicates if group addressed BUs are buffered for an "i-th" link. In such an example, there can be eight states available which may imply that for 000 no group addressed BUs are buffered, for 001 group addressed BUs are buffered for a first link (e.g., link1), for 010 group addressed BUs are buffered for a second link (e.g., link2), for 011 group addressed BUs are buffered for link1 and link2, for 100 group addressed BUs are buffered for a third link (e.g., link3), for 101 group addressed BUs are buffered for link1 and link3, for 110 group addressed BUs are buffered for link2 and link3, and for 111 group addressed BUs are buffered for link1, link2, and link3. In some embodiments, the second indication may be indicated when the TIM type is DTIM. In some embodiments, the second indication may be included in the separate element (or the separate field within the TIM element) when the TIM type is DTIM. In some embodiments, the second indication may be the AP MLD's recommendation on which link the group addressed MSDUs or MMPDUs may be transmitted.

In some embodiments, an AP MLD may allocate an AID to a non-AP MLD operating on a first set of links. In such an embodiment, the AID may be included in a first plurality of AIDs, where the first plurality of AIDs may not include a first set of AIDs, and where at least one of the first set of AIDs are assigned to APs or BSSIDs on a second set of links. In some embodiments, the second set of links may be the same as the first set of links. In some embodiments, the second set of links may be a set of links on which the AP MLD is operating. In such an embodiment, the AP MLD may indicate that a first AID may be associated with a first set of APs affiliated with the AP MLD. Thus, when the AP MLD transmits a frame carrying a TIM element, a traffic indication virtual bitmap bit associated with the first AID may be set to one when one or more group addressed MSDUs or MMPDUs are buffered at the first set of APs affiliated with the AP MLD. In such an embodiment, the size of the first set of APs may be one and the AP MLD may have one or more affiliated APs, such that one AID is assigned to each affiliated AP.

In some embodiments, when a first AID may be allocated for a first set of APs, the size of the first set may be one. In one embodiment, the value of the first AID may be greater than 2007. In another embodiment, the value of the first AID may be greater than 8191. In some embodiments, an AP MLD may further indicate that a second AID may be associated with a second set of APs affiliated with the AP MLD, such that the traffic indication virtual bitmap bit associated with the second AID may be set to one when one or more group addressed MSDUs or MMPDUs are buffered at the second set of APs, and where the size of the second set may be one. In such an embodiment, the first AID and the second AID may be consecutive numbers. In one embodiment, the traffic indication virtual bitmap bit associated with the first AID may be set to one when one or more group addressed MSDUs or MMPDUs are buffered at the first set of APs and are not to be delivered using a group AID. In another embodiment, the traffic indication virtual bitmap bit associated with the first AID can be set to one when a DTIM Count field in the TIM element is set to zero. In some embodiments, the TIM element may be a modified TIM element (from a conventional TIM element) to support additional features of non-legacy communication protocols (e.g., the EHT communication protocol and next-generation communication protocols). In one embodiment, an AP affiliated with the AP MLD may transmit a management frame including the TIM element, such that a bit of a traffic indication virtual bitmap corresponding to a set of APs affiliated with the AP MLD in the TIM element indicates if the set of APs in the same AP MLD have buffered group addressed frames. In one embodiment, the size of the set of APs is one.

An operation example that represents allocating a separate AID for a set of APs operating on different links is described in detail with reference to FIG. 2.

Figure 2:
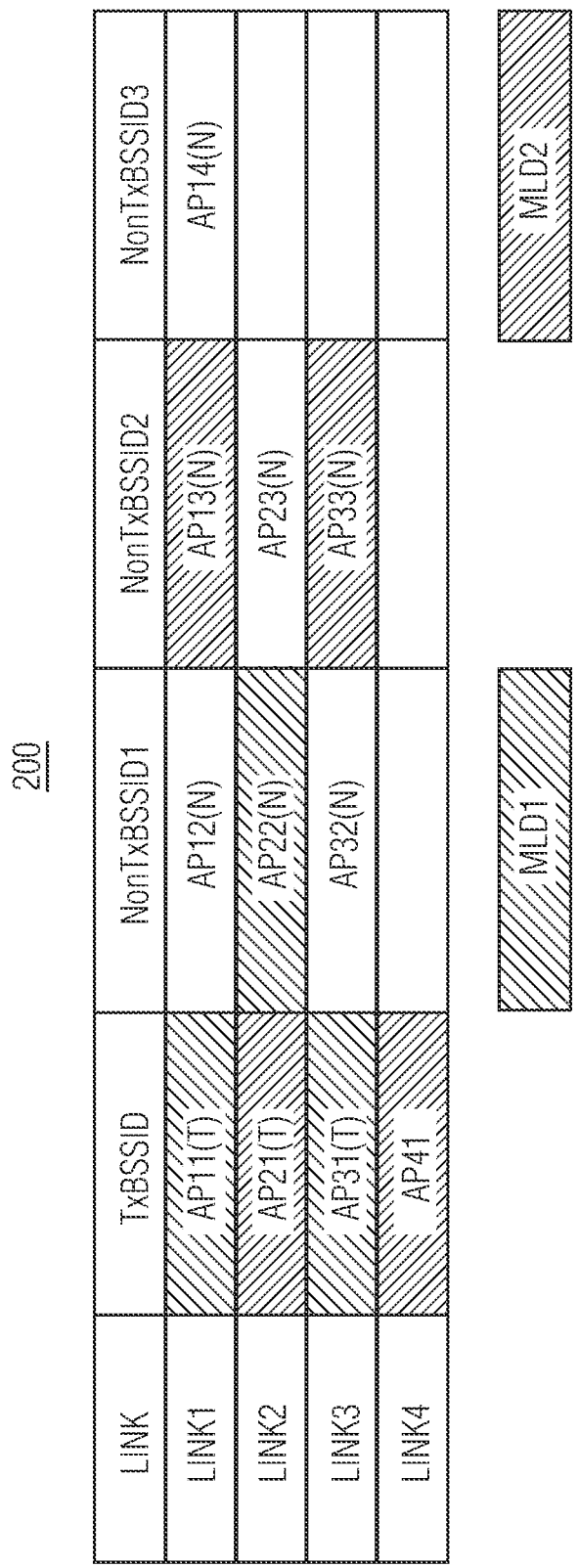
FIG. 2 is a table that represents an operation example of allocating a separate Association ID (AID) for a set of Access Points (APs) operating on different links in accordance with an embodiment of the invention.

FIG. 2 is a table, 200, that represents an operation example of allocating a separate AID for a set of APs operating on different links in accordance with an embodiment of the invention, such that the size of the set of APs is 1. With reference to FIG. 2, the table may include APs affiliated with different MLDs that support multiple BSSID and which operate on different links. In particular, the table in FIG. 2 shows five columns, implemented as a first column which indicates a link, a second column which indicates APs that correspond to a transmitted BSSID within each multiple BSSID set (shown as Tx BSSID) or APs that are not members of a BSSID set for each link, a third column which indicates APs that correspond to a first non-transmitted BSSID within each multiple BSSID set (shown as Non-TxBSSID1) for each link, a fourth column which indicates APs that correspond to a second non-transmitted BSSID within each multiple BSSID set (shown as NonTxBSSID2) for each link, and a fifth column which indicates APs that correspond to a third non-transmitted BSSID within each multiple BSSID set (shown as NonTxBSSID3) for each link. In such an embodiment, "(T)" denotes Transmitted BSSID and "(N)" denotes Non-transmitted BSSID. In some embodiments, a first MLD, MLD1 (indicated by hatching which corresponds to MLD1), may include three APs, AP11(T), AP22(N), and AP31(T). In some embodiments, a second MLD, MLD2 (indicated by hatching which corresponds to MLD2), may include four APs, AP13(N), AP21 (T), AP33(N), and AP41, such that AP41 may not support multiple BSSID. In some embodiments, AP12(N), AP14(N), AP23(N), and AP32(N) may be included in a different MLD (other than MLD1 and/or MLD2).

With reference to FIG. 2, the operation example of allocating a separate AID for a set of APs operating on different links may involve allocating AIDs (from a value of zero and up to a value of eight or nine) in order of links from lowest to highest (e.g., Link1, Link2, Link3, then Link4). In some embodiments, "N_i" may represent the number of APs affiliated with MLD1/MLD2 or may represent a maximum possible number of APs that can be a member of APs affiliated with MLD1 or MLD2, such that "i" is equal to 1 for MLD1 and "i" is equal to 2 for MLD2. In some embodiments, AP11, AP21, AP31, and/or AP41 may transmit a Beacon frame that includes a TIM element. In one embodiment, AP11 may be a member of MLD1, in which there are three APs (e.g., AP11, AP22, and AP31) that are members of MLD1 where N_1 is equal to three. In another embodiment, AP11 may be a member of MLD1, in which there are three APs (e.g., AP11, AP22, and AP31) that are members of MLD1 where MLD1 declares that MLD1's maximum possible number of APs is 4 and N_1 is equal to four. In some embodiments, AP11 may support multiple BSSID, such that a maximum number of BSSIDs is equal to four, and such that there may be three APs (e.g., AP12, AP13, and AP14) that correspond to non-transmitted BSSID. In one embodiment, AP21 may be a member of MLD2, in which there are four APs (e.g., AP13, AP21, AP33, and AP41) that are members of MLD2 where N_2 is equal to four. In some embodiments, AP21 may support multiple BSSID, such that a maximum number of BSSIDs is equal to four, and such that there may be two APs (e.g., AP22 and AP23) that correspond to non-transmitted BSSID.

With further reference to FIG. 2, in some embodiments, for a TIM element sent by AP11, an AID value of zero may correspond to AP11. In some embodiments, for the TIM element sent by AP11, an AID value of one, two, and three may correspond to AP12, AP13, and AP14, which correspond to non-transmitted BSSID, respectively. In some embodiments, for the TIM element sent by AP11, an AID value of four and five may correspond to AP22 and AP31, which correspond to members of MLD1 (excluding AP11), respectively, such that N_1 is equal to three. In one embodiment, for the TIM element sent by AP11, an AID value of six, seven, and eight may correspond to AP21, AP33, and AP41, which correspond to members of MLD2 (excluding AP13), respectively. In another embodiment, for the TIM element sent by AP11, the AID value of six may be reserved (or set to zero) and an AID value of seven, eight, and nine may correspond to AP21, AP33, and AP 41, which correspond to members of MLD2 (excluding AP13), respectively, such that N_1 is equal to four.

With further reference to FIG. 2, in some embodiments, for a TIM element sent by AP21, an AID value of zero may correspond to AP21. In some embodiments, for the TIM element sent by AP21, an AID value of one and two may correspond to AP22 and AP23, which correspond to non-transmitted BSSID, respectively. In some embodiments, for the TIM element sent by AP21, an AID value of three may be reserved (or set to zero) and an AID value of four, five, and six may correspond to AP13, AP33, and AP41, which correspond to members of MLD2 (excluding AP21), respectively. In some embodiments, for the TIM element sent by AP21, an AID value of seven and eight may correspond to AP11 and AP31, which correspond to members of MLD1 (excluding AP22), respectively. In some embodiments, for the TIM element sent by AP21, an AID value of nine may be reserved (or set to zero), such that N_1 is equal to four.

In one embodiment, an AP may have multiple BSSID support, such that if a BSSID of a first AP affiliated with an AP MLD on a link is a non-transmitted BSSID, and a Beacon frame transmitted by a second AP includes information on buffered frame status of the first AP, a bit in a traffic indication bitmap included in the Beacon frame that corresponds to the first AP may be set to one if one or more group addressed frames are buffered at the AP MLD. In such an embodiment, a BSSID of the second AP may be a transmitted BSSID. In some embodiments, the traffic indication bitmap may be included in a TIM element of the Beacon frame. In some embodiments, a first AID may be assigned for the first AP, such that the bit in the traffic indication bitmap may correspond to the first AID. In some embodiments, when a DTIM Count field carried in a Multiple-BSSID-Index element is zero for the first AP, and one or more group addressed frames are buffered at the AP MLD, then the bit corresponding to the first AID may be set to one.

In another embodiment, an AP may have multiple BSSID support, such that the BSSID of the first AP affiliated with the AP MLD on the link may be the non-transmitted BSSID, and a broadcast frame transmitted by the second AP may include information on the buffered frame status of the first AP. In such an embodiment, when one or more group addressed MSDUs or MMPDUs are buffered at the AP MLD, then the second AP may transmit the broadcast frame with a first indication set to a specific value, such that the first indication may indicate that one or more group addressed MSDUs or MMPDUs are buffered at the AP MLD. In such an embodiment, the BSSID of the second AP may be a transmitted BSSID. In such an embodiment, the first AP may be a member of a Multiple BSSID Set managed by the second AP. In some embodiments, the first indication may be included in a TIM element. In some embodiments, a traffic indication bitmap may be included in the TIM element of a Beacon frame. In one embodiment, a first AID may be assigned for the first AP and the first indication may be indicated in a bit in the traffic indication bitmap corresponding to the first AID in the TIM element. In another embodiment, the first AID may be assigned for the AP MLD and the first indication may be indicated in the bit in the traffic indication bitmap corresponding to the first AID in the TIM element.

Additionally, in some embodiments, the size of the first indication may be 1-bit. In some embodiments, the broadcast frame may be the Beacon frame. In some embodiments, the specific value may be one. In one embodiment, the first indication may be set to the specific value when a DTIM Count field in the TIM element is set to zero. In another embodiment, the first indication may be set to the specific value when the one or more group addressed MSDUs or MMPDUs are not to be delivered using a group AID. In another embodiment, the first indication may be set to the specific value when buffered non-GCR-SP addressed BUs that may be delivered using MPDUs with an RA other than a SYNRA, but that are not delivered using the group AID from an AP affiliated with the AP MLD. In some embodiments, the broadcast frame may further include a second indication to indicate if one or more group addressed MSDUs or MMPDUs are buffered at the first AP. In such an embodiment, the first AID may be assigned for the first AP, such that the first indication may be indicated in the bit in the traffic indication bitmap corresponding to the first AID in the TIM element. Furthermore, in such an embodiment, a second AID may be assigned for the AP MLD, such that the second indication may be indicated in the bit in the traffic indication bitmap corresponding to the second AID in the TIM element.

An operation example for indicating buffered frame status when an AP has multiple BSSID support is described in detail with reference to FIG. 3.

Figure 3:
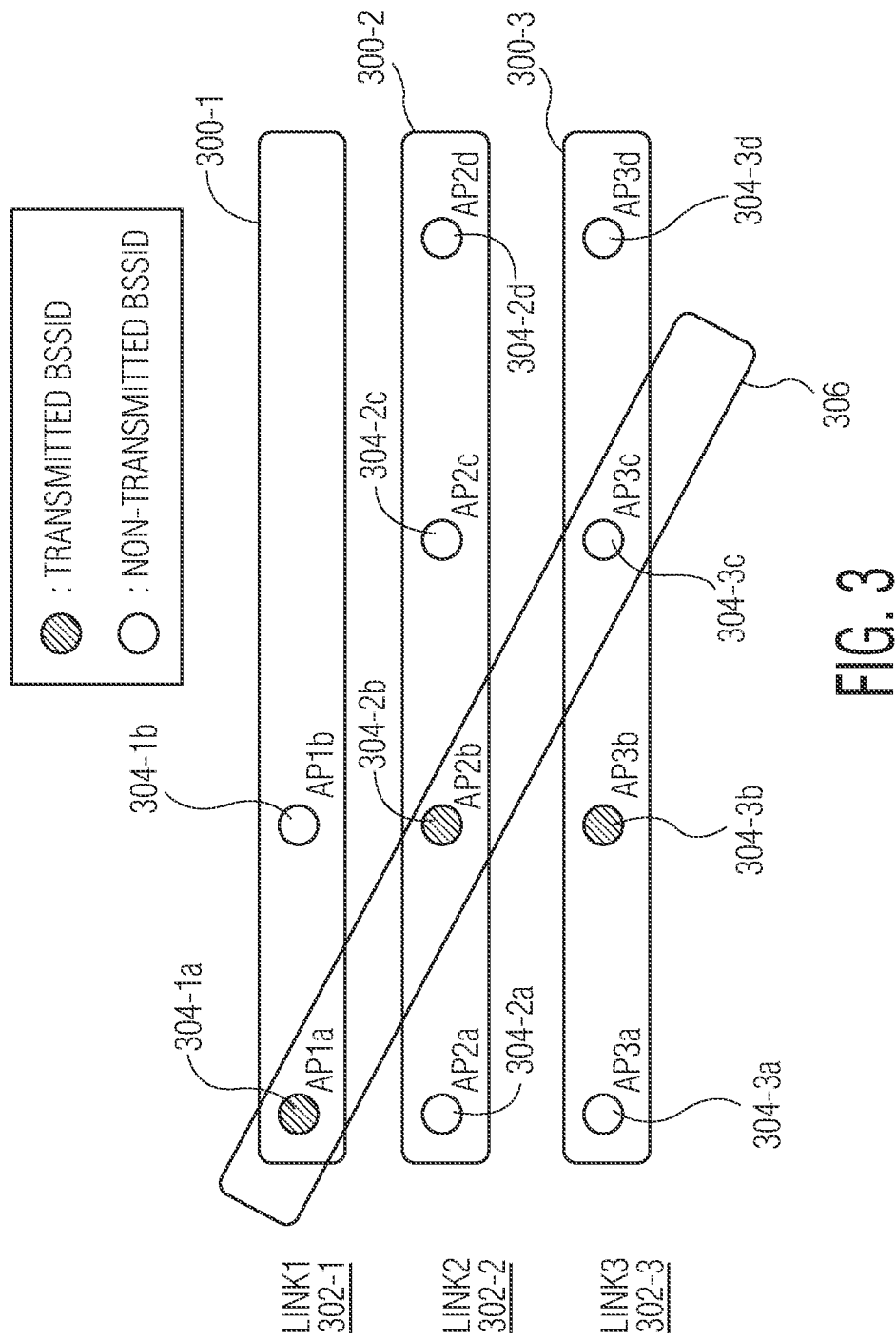
FIG. 3 depicts an operation example for indicating buffered frame status when an AP has multiple Basic Service Set Identifier (BSSID) support in accordance with an embodiment of the invention.

FIG. 3 depicts an operation example for indicating buffered frame status when an AP has multiple BSSID support in accordance with an embodiment of the invention. With reference to FIG. 3, the operation example depicts ten co-located APs which may be a non-transmitted BSSID and/or a transmitted BSSID, and which operate on multiple links. In particular, FIG. 3 shows two co-located APs, implemented as AP1a 304-1a and AP1b 304-1b, which operate on a first link, Link1 302-1, and are part of a first multiple BSSID set 300-1, four co-located APs, implemented as AP2a 304-2a, AP2b 304-2b, AP2c 304-2c, and AP2d 304-2d, which operate on a second link, Link2 302-2, and are part of a second multiple BSSID set 300-2, and four co-located APs, implemented as AP3a 304-3a, AP3b 304-3b, AP3c 304-3c, and AP3d 304-3d, which operate on a third link, Link3 302-3, and are part of a third multiple BSSID set 300-3. In such an embodiment, AP1a 304-1a on Link1 302-1, AP2b 304-2b on Link2 302-2, and AP3c 304-3c on Link3 302-3, are each APs affiliated with a first MLD, MLD1 306. In some embodiments, the BSSIDs of AP1a 304-1a, AP2b 304-2b, and AP3b 304-3b may each be a transmitted BSSID. In some embodiments, the BSSIDs of AP1b 304-1b, AP2a 304-2a, AP2c 304-2c, AP2d 304-2d, AP3a 304-3a, AP3c 304-3c, and AP3d 304-3d may each be a non-transmitted BSSID.

With reference to FIG. 3, the first multiple BSSID set 300-1 may have one non-transmitted BSSID, the second multiple BSSID set 300-2 may have three non-transmitted BSSIDs, and the third multiple BSSID set 300-3 may have three non-transmitted BSSIDs. In some embodiments, as the BSSIDs of AP1a 304-1a on Link1 302-1 and AP2b 204-2b on Link2 302-2 are transmitted BSSID, AID 0 may be set to one when one or more group addressed MSDUs or MMPDUs are buffered at MLD1 306 on Link1 302-1 and Link2 302-2. In some embodiments, as the BSSID of AP3c 304-3c on Link3 302-3 is non-transmitted BSSID, an AID corresponding to AP3c 304-3c may be set to one when one or more group addressed MSDUs or MMPDUs are buffered at MLD1 306 on Link3 302-3.

In some embodiments, when multiple BSSID is supported, a Partial Virtual Bitmap field of a TIM element may be constructed such that a maximum possible number of BSSIDs is an integer power of 2, n=log 2 (maximum possible number of BSSIDs). In such an embodiment, bits 1 to $(2^n-1)$ of the bitmap may be used to indicate that one or more group addressed frames are buffered for each AP corresponding to a non-transmitted BSSID (sometimes referred to herein as "NonTxBSS identifiers" or "Non-TxBSS IDs"). In such an embodiment, AIDs from 1 to $(2^n-1)$ may not be allocated to a non-AP STA. In some embodiments, a bit position corresponding to an inactive non-transmitted BSSID may be reserved and set to zero. In some embodiments, when a DTIM Count field carried in a Multiple BSSID-Index element is zero for a BSS that has a non-transmitted BSSID, and one or more group addressed frames are buffered at the AP for the BSS, the corresponding NonTxBSS ID bit may be set to one. In some embodiments, each bit (starting from bit $2^n$) in a traffic indication virtual bitmap corresponds to individually addressed traffic buffered for a specific STA within a BSS corresponding to a transmitted BSSID or a non-transmitted BSSID at the time a Beacon frame is transmitted.

Consequently, BSSIDs belonging to the same multiple BSSID may not be a part of the same AP MLD. As an example, an AP (e.g., AP1) may be affiliated with an AP MLD and transmit a Beacon frame in which AP1 supports multiple BSSID (maximum possible number of BSSIDs for AP1 may be $2^n$) and may not be able to assign AIDs 1 to $(2^n-1)$ for each associated STA. Furthermore, in such an example, another AP (e.g., AP2) may also be affiliated with the AP MLD, but AP2 may not support multiple BSSID and may be able to assign AIDs from 1 for each associated STA. In some embodiments, when a bit in a traffic indication virtual bitmap of a TIM element that corresponds to a non-AP MLD is set to one and if an individually addressed BU for the non-AP MLD is buffered by the AP MLD, then the traffic indication virtual bitmap of a TIM element that corresponds to AIDs 1 to $(2^n 2^n-1)$ may be doubly defined if the TIM element is transmitted by AP1. For example, if AIDs 1 to $(2^n-1)$ are assigned to non-AP MLDs by AP2 (as AP2 does not support multiple BSSID), then at AP1, AIDs 1 to $(2^n-1)$ correspond to non-transmitted BSSID and at the same time AIDs 1 to $(2^n-1)$ correspond to associated non-AP MLDs. Thus, STAs receiving the bitmap are unable to interpret which STA has a buffered frame from the AP MLD.

To enable STAs to interpret which STA has a buffered frame from the AP MLD, several techniques in accordance with an embodiment of the invention are described herein. In addition, in embodiments described herein, a representing AP for a first AP may be defined (i) such that if the first AP is an AP whose BSSID is a transmitted BSSID, then the representing AP for the first AP may be the first AP, or (ii) such that if the first AP is an AP whose BSSID is a non-transmitted BSSID, then the representing AP for the first AP may be an AP that transmits a Beacon frame which includes information on a non-transmitted BSSID profile corresponding to the first AP.

In one embodiment, AIDs included in a first plurality of AIDs allocated to APs on the first set of links by a representing AP for each AP affiliated with an AP MLD may not be assigned to a non-AP MLD that is associated with the AP MLD. For example, when allocating, by the AP MLD, a plurality of AIDs to a plurality of non-AP MLDs, the AP MLD may exclude AIDs included in the first plurality of AIDs allocated to APs on the first set of links by the representing AP for each AP affiliated with the AP MLD, and allocate one of the AIDs (which does not include the first plurality of AIDs) to the non-AP MLD associated with the AP MLD. In another embodiment, each AID that can be used to indicate non-transmitted BSSID by each AP affiliated with the AP MLD may not be assigned to the non-AP MLD that is associated with the AP MLD. For example, when allocating, by the AP MLD, the plurality of AIDs to the plurality of non-AP MLDs, the AP MLD may exclude AIDs included in the first plurality of AIDs allocated to non-transmitted BSSID on the first set of links, and allocate one of the AIDs (which does not include the first plurality of AIDs) to the non-AP MLD associated with the AP MLD.

In one embodiment, a BSSID of an AP affiliated with an AP MLD may be a transmitted BSSID. In another embodiment, the BSSID of the AP affiliated with the AP MLD may be a non-transmitted BSSID. In some embodiments, a representing AP affiliated with the AP MLD may be affiliated with another AP MLD. In some embodiments, the AP affiliated with the AP MLD may transmit a Beacon frame which includes information on a non-transmitted BSSID profile corresponding to another AP affiliated with another AP MLD. In some embodiments, an AID may be used to indicated non-transmitted BSSID in a traffic indication virtual bitmap, such that a bit corresponding to the AID indicates if an AP with corresponding non-transmitted BSSID has buffered one or more group addressed frames.

In one embodiment, if there are "N" APs (e.g., AP_1, ..., AP_N) affiliated with an AP MLD, such that N is an integer greater than 1, and a BSSID of an "i-th" AP is a transmitted BSSID, such that "i" is an integer greater than or equal to 1, then the maximum possible number of BSSIDs that can be indicated in a TIM element from the i-th AP may be denoted by $2^{\{n\_i\}}$. In another embodiment, if there are "N" APs (e.g., AP_1, ..., AP_N) affiliated with the AP MLD and if the BSSID of the "i-th" AP is a non-transmitted BSSID, then the maximum possible number of BSSIDs that can be indicated in a TIM element that an AID is assigned for the i-th AP may be denoted by $2^{\{n\_i\}}$. In such embodiments, the AIDs from 1 to max_$\{1 \le i \le N\}$ $(2^{\{n\_i\}}-1)$ may not be allocated to a non-AP MLD associated with the AP MLD. In some embodiments, if the i-th AP does not support multiple BSSID, then $2^{\{n\_i\}}=1$. In some embodiments, if there are N APs (e.g., AP_1, ..., AP_N) affiliated with the AP MLD and the i-th AP supports K_i non-transmitted BSSIDs, then the AIDs from 1 to max_$\{1 \le i \le N\}$ (K_i) may not be allocated to the non-AP MLD associated with the AP MLD, such that K is an integer greater than or equal to 1.

In another embodiment, if there are N APs (e.g., AP_1, ..., AP_N) affiliated with an AP MLD and the maximum possible number of BSSIDs in a TIM element from a representing AP for the i-th AP may be $2^{\{n\_i\}}$, then the AIDs from 1 to max_$\{1 \le i \le N\}$ $(2^{\{n\_i\}}-1)$ may not be allocated to a non-AP MLD associated with the AP MLD. In such an embodiment, if the i-th AP does not support multiple BSSID, then $2^{\{n\_i\}}=1$. In some embodiments, if there are N APs (e.g., AP_1, ..., AP_N) affiliated with the AP MLD and the TIM element from the representing AP for the i-th AP supports K_i non-transmitted BSSIDs, then the AIDs from 1 to max $\{1 \le i \le N\}$ (K_i) may not be allocated to the non-AP MLD associated with the AP MLD.

In some embodiments, when multiple BSSID is supported, the operation example depicted in FIG. 3 may represent a technique for allocating AIDs when an AP has multiple BSSID. As an example, the number of non-transmitted BSSIDs within a Multiple BSSID set (e.g., the first Multiple BSSID set 300-1, the second multiple BSSID set 300-2, or the third multiple BSSID set 300-3) on each link (e.g., Link1 302-1, Link2, 302-2, or Link3 302-3) may be different. In such an example, AP1*a* 304-1*a* (transmitted BSSID) may have one non-transmitted BSSID (e.g., AP1*b* 304-1*b*), AP2*b* 304-2*b* (transmitted BSSID) may have three non-transmitted BSSIDs (e.g., AP2*a* 304-2*a*, AP2*c* 304-2*c*, and AP2*d* 304-2*d*), and AP3*b* 304-3*b* (transmitted BSSID) may have three non-transmitted BSSIDs (e.g., AP3*a* 304-3*a*, AP3*c* 304-3*c*, and AP3*d* 304-3*d*). In such an embodiment, AP1*a* 304-1*a* on Link1 302-1, AP2*b* 304-2*b* on Link2 302-2, and AP3*c* 304-3*c* on Link3 302-3, are each APs affiliated with a first MLD, MLD1 306. In such an example, AIDs from 1 to max(1, 3, 3)=3 may not be assigned to a non-AP MLD by MLD1 306, such that 1, 3, and 3, of max(1, 3, 3) represent the number of non-transmitted BSSID on each Multiple BSSID set while supporting $\max\_\{1 \leq i \leq N\} (2^\{n\_i\}-1)$.

In some embodiments, another operation example may involve an AP MLD that includes AP1 on a first link (e.g., Link1 302-1) and AP2 on a second link (e.g., Link2 302-2). In such an example, AP1 has a transmitted BSSID and a Multiple BSSID element which defines three non-transmitted BSSID profiles (e.g., AP1*a*, AP1*b*, and AP1*c*), such that n_1=2, and in a TIM element on Link1 302-1 of the AP MLD, AID1, AID2, and AID3 may correspond to AP1*a*, AP1*b*, and AP1*c*, respectively. In some embodiments, another AP, AP0, has a transmitted BSSID and Multiple BSSID element which defines seven non-transmitted BSSID profiles (e.g., AP2, AP0*a*, AP0*b*, AP0*c*, AP0*d*, AP0*e*, and AP0*f*), such that n_2=3, and in a TIM element on Link2 302-2 of AP0, AID1, AID2, AID3, AID4, AID5, AID6, and AID7 correspond to AP2, AP0*a*, AP0*b*, AP0*c*, AP0*d*, AP0*e*, and AP0*f*, respectively. In some embodiments, AIDs one to seven (=max ($2^2-1, 2^3-1$)) may not be allocated to non-AP MLDs that are associated with the AP MLD. In some embodiments, AP1 may assign AID4, AID5, AID6, and AID7 to single link STAs.

In some embodiments, each AP affiliated with an AP MLD may schedule for the transmission of buffered group addressed frames immediately after each DTIM Beacon. In some embodiments, a Target Wake Time (TWT) scheduling AP affiliated with the AP MLD may schedule for the transmission of buffered group addressed frames during broadcast TWT Service Periods (SPs) located within a Beacon interval during which the DTIM Beacon may be transmitted.

In some embodiments, each AP affiliated with an AP MLD may schedule the transmission of buffered group addressed management frames independently from the transmission of buffered group addressed management frames of other AP(s) affiliated with the same AP MLD. In some embodiments, each AP affiliated with an AP MLD may schedule the transmission of buffered group addressed data frames that are expected to be received by a non-AP MLD in each link setup with the non-AP MLD.

In some embodiments, if an AP affiliated with an AP MLD is not part of a multiple BSSID set or the AP corresponds to a transmitted BSSID in a multiple BSSID set, then the AP may indicate which of the other AP(s) in the same AP MLD have buffered group addressed frames via a set of bits in a Partial Virtual Bitmap field of a TIM element after a last bit corresponding to a non-transmitted BSSID (if any) (maximum possible number of BSSIDs−1) which is in the same multiple BSSID as the AP. In such an embodiment, the indication may be in a DTIM Beacon transmitted by the AP and may be based on the latest information corresponding to other APs that the AP has when the AP schedules the DTIM Beacon. In such an embodiment, bits in the Partial Virtual Bitmap field of the TIM element for other AP(s) in the same AP MLD may be contiguous.

In some embodiments, if an AP affiliated with an AP MLD is a non-transmitted BSSID in a multiple BSSID set, then the AP that corresponds to a transmitted BSSID in the same multiple BSSID set may indicate which of the other AP(s) in the same AP MLD as the non-transmitted BSSID have buffered group addressed frames via a set of bits in a Partial Virtual Bitmap field of a TIM element after a last bit corresponding to the non-transmitted BSSID (if any) (maximum possible number of BSSIDs−1) which is in the same multiple BSSID as the AP. In such an embodiment, the indication may be in a DTIM Beacon corresponding to the non-transmitted BSSID sent by the transmitted BSSID of the same multiple BSSID set as the non-transmitted BSSID and may be based on the latest information corresponding to other APs of the AP MLD that the transmitted BSSID has when the AP schedules the DTIM Beacon. In such an embodiment, bits in the Partial Virtual Bitmap field of the TIM element for other AP(s) in the same AP MLD may be contiguous.

In some embodiments, an AP affiliated with an AP MLD may indicate if each AP in the same AP MLD has buffered group addressed frames by using an existing TIM element. In one embodiment, if the AP is not part of a multiple BSSID set or if the AP is part of the multiple BSSID set which is a transmitted BSSID, then the indication may be in a DTIM Beacon transmitted by the AP and may be based on the latest information about the other APs that the AP MLD has when the AP schedules the DTIM Beacon. In another embodiment, if the AP is a non-transmitted BSSID in a multiple BSSID set, then the indication may be in the DTIM Beacon corresponding to the non-transmitted BSSID transmitted by the transmitted BSSID of the same multiple BSSID set as the AP and may be based on the latest information about the other APs that the transmitted BSSID has when the AP MLD schedules the DTIM Beacon. In each embodiment, to indicate if each AP in the same AP MLD has buffered group addressed frames by using existing TIM elements, an AID needs to be assigned for each AP. However, AIDs are currently assigned only for non-AP STAs and/or non-AP MLDs, as well as for group addressed frame transmission for APs that correspond to transmitted BSSID and non-transmitted BSSID that operate on the links of the AP MLD. Therefore, a technique for assigning an AID to each AP in the same AP MLD which are operating on different links from the AP that broadcasts the TIM element is needed.

In one embodiment, an AP affiliated with an AP MLD may explicitly indicate information that identifies which AID may be assigned for each AP affiliated with the AP MLD in a management frame. In some embodiments, the management frame may include a Multi-Link (ML) element to indicate the AID for each AP affiliated with the AP MLD. As an example, a first field may be defined in each Per-STA Profile subelement in a Basic variant ML element to indicate the assigned AID for an AP that corresponds to the Per-STA Profile subelement. As another example, a Link ID subfield in each Per-STA Profile subelement in the Basic variant ML element may be used to indicate the assigned AID for an AP that corresponds to the Per-STA Profile subelement, such that the Link ID subfield specifies a value that uniquely identifies a link where the AP may be operating.

In another embodiment, a first field may be defined in a Common Info field of a Basic variant ML element to indicate information for AIDs that correspond to each AP affiliated with an AP MLD. In such an embodiment, an AID for a specific AP affiliated with the AP MLD can be calculated as a function of the value of the first field and link specific information of the specific AP. In one embodiment, the first field may indicate an offset (or a starting AID) for the APs affiliated with the AP MLD. In another embodiment, the maximum value of the first field that can be indicated may be less than the size of a virtual bitmap (2008) that a TIM element can indicate, for example, the maximum value that the first field can indicate may be 255. Examples of the link specific information of the specific AP may include a Link ID of the specific AP, an Order of the Per-STA Profile subelement in the Basic variant ML element that corresponds to the specific AP, and/or an order of Link ID that corresponds to the specific AP (e.g., from the lowest to the highest or from the highest to the lowest). Examples of the function of the first field (V) and the link specific information (Ln) of the specific AP (APn) may include AID (APn)=V+Ln and/or AID (APn)=XOR (V, Ln), such that "XOR" implies an "Exclusive OR" operation for V and Ln.

In another embodiment, a management frame may include a Reduced Neighbor Report (RNR) element to indicate the AID for each AP affiliated with the AP MLD. In such an embodiment, a Link ID subfield in a MLD Parameters subfield in a Target Beacon Transmission Time (TBTT) Information field that corresponds to an AP affiliated with the AP MLD may be used to indicate the assigned AID for the AP. As an example, the Link ID subfield may indicate a link identifier of the AP within the AP MLD to which the AP may be affiliated, such that the link identifier may be unique to an AP within the AP MLD. As another example, the Link ID subfield may specify a value that uniquely identifies a link where the AP may be operating.

In some embodiments, the difference between assigned AIDs for APs affiliated with the same AP MLD may be within a predetermined range. In one embodiment, adjacent AIDs may be assigned for APs affiliated with the same AP MLD. In another embodiment, assigned AIDs for APs affiliated with the same AP MLD may be confined within a range of [V, V+N], such that V and N may each be an integer greater than or equal to 1. In such an embodiment, $N=2^K-1$, for example, K may be a predetermined value of either (1) the maximum number of available number of links, (2) K=4, or (3) the number of links held by the AP MLD, etc. In some embodiments, the maximum value of the AIDs that can be assigned to APs may be less than the size of the virtual bitmap (2008). As an example, the maximum value may be 255 or 256. As another example, the maximum value may be 255 (max. for V)+15 (max. for N)=270. As another example, the maximum value may be 256 (max. for V)+15 (max. for N)=271.

In some embodiments, if a first AID is assigned for a first AP affiliated with an AP MLD in a first TIM element included in a first Beacon frame transmitted on a first link, then the same AID (e.g., the first AID) may be assigned for the first AP in a second TIM element included in a second Beacon frame transmitted on the second link. For example, the same AID may be assigned for an AP regardless of the link on which the TIM element is transmitted, such that the TIM element indicates whether or not the group addressed frame is buffered for the AP. For an AP MLD, if a first set of AIDs are used to indicate whether or not each AP in the AP MLD have a buffered group addressed BU, then the first set of AIDs may not be assigned to non-AP STAs and non-AP MLDs that are associated with APs affiliated with the AP MLD.

In some embodiments, a set of bits in a TIM element transmitted in a management frame from an AP affiliated with an AP MLD on a first link may correspond to a first set of AIDs. In such an embodiment, the first set of AIDs may be assigned to APs corresponding to a non-transmitted BSSID and APs affiliated with the AP MLD on at least one link that is not the first link.

In one embodiment, an AP affiliated with an AP MLD may implicitly indicate information that identifies which AID is assigned for each AP affiliated with the AP MLD in a management frame. In some embodiments, a TIM element transmitted in the management frame may include a predetermined range of AIDs that are assigned to APs affiliated with an AP MLD. In such an embodiment, there may be no subfield that explicitly indicates the assigned AID of each AP affiliated with the AP MLD, rather, the AID may be calculated based on other parameters included in the management frame.

In some embodiments, for an AP affiliated with an AP MLD, if dot11MultiBSSIDImplemented is false (or if the AP is not part of a multiple BSSID set), AIDs [1, N] may be assigned for APs affiliated with the AP MLD. In one embodiment, if there are K APs affiliated with the AP MLD, then N=K, and AIDs of [1, N] may be assigned to each of K APs in a predetermined order. In another embodiment, if there are K APs affiliated with the AP MLD, then N=K−1, and AIDs of [1, K−1] may be assigned to each of K−1 APs (excluding the AP) in a predetermined order. As an example, the predetermined order may involve assigning AIDs in increasing order to APs from the lowest Link ID to the highest Link ID. As another example, the predetermined order may involve assigning AIDs in increasing order to APs from the highest Link ID to the lowest Link ID.

In some embodiments, for an AP that transmits a Beacon frame which includes a TIM element, if dot11MultiBSSIDImplemented is true (or if the AP is part of a multiple BSSID set), then AIDs 1 to $(2^n-1)$ may be assigned to each AP corresponding to a non-transmitted BSSID, where the maximum possible number of BSSIDs is an integer power of 2, n=log 2 (maximum possible number of BSSIDs). In some embodiments, when AP_i corresponds to i-th non-transmitted BSSID when i>0, or transmitted BSSID when i=0, if AP_i is a member of an AP MLD (AP MLD_i) and a predetermined number N_i is assigned to AP MLD_i, then AIDs K_i to L_i=K_i+N_i−2 may be assigned to each AP affiliated with the AP MLD_i (excluding AP_i) in a predetermined order. Examples of the predetermined order may include (1) the increasing order of APs from the lowest Link ID to the highest Link ID, or (2) the increasing order of APs from the highest Link ID to the lowest Link ID. Examples of the predetermined number N_i may include (1) the number of APs that are affiliated with AP MLD_i, (2) the maximum possible number of APs that can be a member of AP MLD_i, and/or (3) a predetermined value explicitly indicated by the management frame. In some embodiments, N_i may be the same for each of the MLDs that are co-located. In some embodiments, if there are N APs affiliated with AP MLD_i (N_i>N), then AIDs that correspond to APs of AP MLD_i with the index ranging [N+1, N_i] may be reserved (or set to 0). In one embodiment, within the multiple BSSID set, if AP_i is the first AP that is a member of an AP MLD, then $K\_i=2^n$. In another embodiment, within the multiple BSSID set, if AP_i is the next AP that is a member of an AP MLD (AP MLD_i) after AP_j that is a member of an AP MLD (AP MLD_j), then K_i=L_j+1=K_j+N_j−1, such that "j" is an integer greater than or equal to 1.

In some embodiments, the operation example depicted by FIG. 2 may also be applied when implicitly indicating information that identifies which AID is assigned for each AP affiliated with the AP MLD in a management frame. Similarly, the operation example depicted by FIG. 2 may involve allocating AIDs (from a value of zero and up to a value of eight or nine) in an increasing order of APs from the lowest link to the highest link (e.g., Link1, Link2, Link3, then Link4).

In some embodiments, for an AP that transmits a Beacon frame that includes a TIM element, if dot11MultiBSSIDImplemented is true (or if the AP is part of a multiple BSSID set), then AIDs 1 to ($2^n$−1) may be assigned to each AP corresponding to a non-transmitted BSSID, where the maximum possible number of BSSIDs is an integer power of 2, n=log 2 (maximum possible number of BSSIDs). In such an embodiment, when AP_i corresponds to i-th non-transmitted BSSID when i>0 or transmitted BSSID when i=0, if AP_i is a member of an AP MLD (AP MLD_i) and a predetermined number N_i is assigned to AP MLD_i, then AIDs K_i to L_i=K_i+N_i−1 may be assigned to each AP affiliated with the AP MLD_i in a predetermined order. In one embodiment, within the multiple BSSID set, if AP_i is the first AP that is a member of an AP MLD, then K_i=$2^n$. In another embodiment, within the multiple BSSID set, if AP_i is the next AP that is a member of an AP MLD (AP MLD_i) after AP_j that is a member of an AP MLD (AP MLD_j), then K_i=L_j+1=K_j+N_j. In some embodiments, AIDs assigned to at least one non-AP MLD may be unique and set to a value greater than at least $2^n$, such that n is a maximum value of log 2 (maximum possible number of BSSIDs) amongst multiple BSSID sets operating on each link of the AP MLD.

In some embodiments, when a non-AP MLD associates with an AP MLD, an AID that can be assigned to the non-AP MLD may exclude a first set of values assigned on a first set of links. For example, the AP MLD may allocate a plurality of AIDs to a plurality of non-AP MLDs, such that one of the AIDs may be allocated to each of the non-AP MLDs, and such that the AP MLD may exclude a first plurality of AIDs allocated to non-AP MLDs on the first set of links. Examples of the first set of links may include (1) links on which multi-link setup is made between the non-AP MLD and the AP MLD, (2) each of the links on which the AP MLD may be operating, and/or (3) each of the links on which the AP MLD may be operating and each of the links on which co-located AP(s) may be operating. As an example, the first set of values may include (i) AID 0 to an AID that corresponds to the maximum possible number of BSSIDs. As another example, the first set of values may include (ii) on a first link within the first set of links, each AID that may be assigned to an AP affiliated with a first AP MLD, such that a second AP with transmitted BSSID and/or non-transmitted BSSID operating on the first link is a member of the first AP MLD and either the second AP is co-located with the AP MLD, or the AP MLD is the first AP MLD. As another example, the first set of values may include (iii) each AID that may be assigned to indicate a buffer status of group addressed frames. As another example, the first set of values may include a combination of (i), (ii), and/or (iii). In such an example, the buffer status of APs within the multiple BSSID set and buffer status of APs within AP MLDs may be co-located with the AP MLD. Additionally, some AIDs may be reserved (or set to 0) if the actual number of APs is smaller than an allocated set of AIDs. For example, AIDs may be assigned according to a maximum possible number of BSSIDs for the indication of buffer status of APs within the multiple BSSID set. As another example, AIDs may be assigned according to a maximum possible number of links for the indication of buffer status of APs within the AP MLD.

An operation example that represents allocating AIDs using an AID range for a non-AP MLD is described in detail with reference to FIGS. 4A-4B.

Figure 4A:
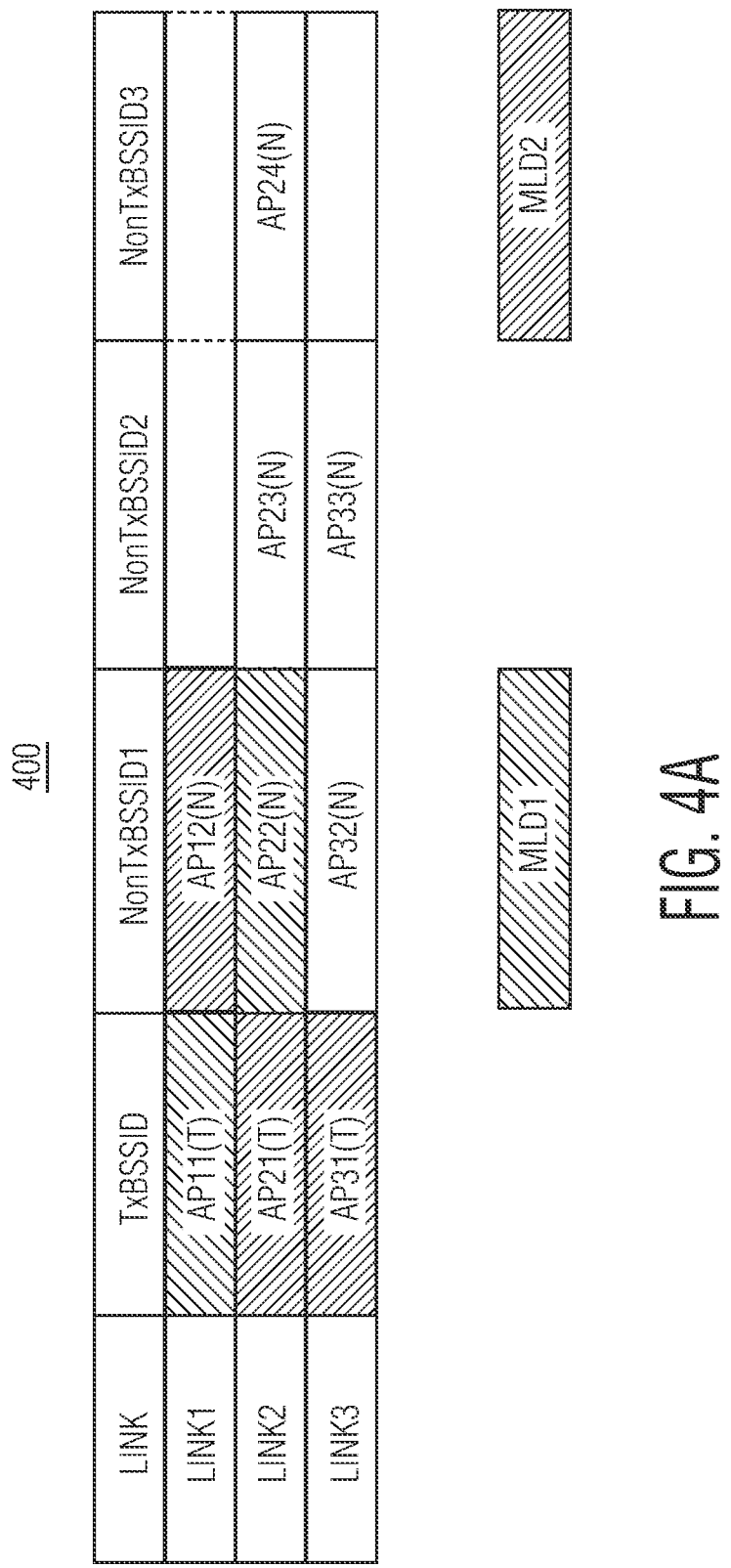
FIG. 4A is a table that represents an operation example of allocating AIDs using an AID range for a non-AP multi-link device (MLD) in accordance with an embodiment of the invention.

FIG. 4A is a table, 400, that represents an operation example of allocating AIDs using an AID range for a non-AP MLD in accordance with an embodiment of the invention. With reference to FIG. 4A, the table may include APs affiliated with different MLDs that support multiple BSSID and which operate on different links. In particular, the table in FIG. 4A shows five columns, implemented as a first column which indicates a link, a second column which indicates APs that correspond a transmitted BSSID within each multiple BSSID set (shown as Tx BSSID), a third column which indicates that correspond to a first non-transmitted BSSID within each multiple BSSID set (shown as NonTxBSSID1), a fourth column which indicates APs that correspond to a second non-transmitted BSSID within each multiple BSSID set (shown as NonTxBSSID2), and a fifth column which indicates APs that correspond to a third non-transmitted BSSID within each multiple BSSID set (shown as NonTxBSSID3). In such an embodiment, "(T)" denotes Transmitted BSSID and "(N)" denotes Non-transmitted BSSID. In some embodiments, a first MLD, MLD1 (indicated by hatching which corresponds to MLD1), may include two APs, AP11(T) and AP22(N). In some embodiments, a second MLD, MLD2 (indicated by hatching which corresponds to MLD2), may include three APs, AP12(N), AP21(T), and AP31(T). In some embodiments, AP23(N), AP24(N), AP32(N), and AP33(N) may be included in a different MLD (other than MLD1 and/or MLD2). In such an embodiment, the maximum number of BSSIDs on Link1 may be two, the maximum number of BSSIDs on Link2 may be four, and the maximum number of BSSIDs on Link3 may be four.

With reference to FIG. 4A, a first set of links may be defined as each of the links that an AP MLD and each of the co-located APs may be operating on (e.g., Link1, Link2, and Link3). In some embodiments, a first set of values may be defined as either (i) AID 0 to an AID that corresponds to the maximum possible number of BSSIDs, and/or (ii) on a first link within the first set of links, each AID that may be assigned to an AP affiliated with a first AP MLD, such that a second AP with transmitted BSSID and/or non-transmitted BSSID operating on the first link is a member of the first AP MLD and either the second AP is co-located with the AP MLD, or the AP MLD is the first AP MLD.

FIG. 4B is a table, 402, that represents AID assignment for an operation example of allocating AIDs using an AID range for a non-AP MLD in accordance with an embodiment of the invention. With reference to FIG. 4B, the table may include APs affiliated with different MLDs that support multiple BSSID, such that the APs may be the APs included in FIG. 4A. In addition, the table 402 may assign AIDs on each link, such that on a first link (e.g., Link1) within the first set of links, each AID that may be assigned to an AP affiliated with a first AP MLD, such that a second AP with transmitted BSSID and/or non-transmitted BSSID operating on the first link is a member of the first AP MLD and either the second AP is co-located with the AP MLD, or the AP MLD is the first AP MLD. In particular, FIG. 4B depicts a table in which a TIM element transmitted by an AP with transmitted BSSID, e.g., AP11(T), AP21(T), and AP31(T) (shown by the first column of table 402), includes an AID assignment (e.g., shown by each of the subsequent columns) for each AP included in the TIM element transmitted by the AP with transmitted BSSID. For example, AP11 TIM represents a TIM element transmitted by AP 11 which assigns AID0 to AP11, AID1 to AP12, AID2 to AP22, AID3 to AP21, and AID4 to AP31. As another example, AP21 TIM represents a TIM element transmitted by AP21 which assigns AID0 to AP21, AID1 to AP22, AID2 to AP23, AID3 to AP24, AID4 to AP12, AID5 to AP31, and AID6 to AP11. As another example, AP31 TIM represents a TIM element transmitted by AP 31 which assigns AD0 to AP31, AID1 to AP32, AID2 to AP33, AID3 to 0, AID4 to AP12, and AID5 to AP21. In some embodiments, AP22, AP21, and AP31 of AP11 TIM, AP12, AP31, and AP11 of AP21 TIM, as well as AP12 an AP21 of AP31 TIM may be APs affiliated with an MLD operation on other links (shown by hatching).

With reference to FIG. 4A and FIG. 4B, in some embodiments, on Link1, AIDs [0, 1] may be assigned to APs corresponding to transmitted/non-transmitted BSSIDs and AIDs [2, 4] may be assigned for APs on other links, such that the first set of values on Link1 is [0, 4]. In some embodiments, on Link2, AIDs [0, 3] may be assigned for APs corresponding to transmitted/non-transmitted BSSIDs and AIDs [4, 6] may be assigned for APs on other links, such that the first set of values on Link2 is [0, 6]. In some embodiments, on Link3, AIDs [0, 3] may be assigned for APs corresponding to transmitted/non-transmitted BSSIDs and AIDs [4, 5] may be assigned for APs on other link, such that the first set of values on Link3 is [0, 5]. In some embodiments, each of the first set of values (e.g., AIDs [0, 4], [0, 6], and/or [0, 5]) may be excluded for the assignment to a non-AP MLD. Therefore, in such an embodiment, an AID with a range from 7 to N can be assigned to the non-AP MLD, such that N is the maximum allowed AID value that may be assigned.

With further reference to FIGS. 4A and 4B, in some embodiments, a non-AP MLD may include a multi-link setup on Link1 and Link3. In such an embodiment, the first set of links may be defined by the links included in the multi-link setup between the non-AP MLD and an AP MLD (e.g., Link1 and Link3). In such an embodiment, on Link1, AIDs [0, 1] may be assigned to APs corresponding to transmitted/non-transmitted BSSIDs and AIDs [2, 4] may be assigned for APs on other links, such that the first set of values on Link1 is [0, 4]. In such an embodiment, on Link2, AIDs [0, 3] may be assigned for APs corresponding to transmitted/non-transmitted BSSIDs and AIDs [4, 6] may be assigned for APs on other links, such that the first set of values on Link2 is [0, 6]. In such an embodiment, on Link3, AIDs [0, 3] may be assigned for APs corresponding to transmitted/non-transmitted BSSIDs and AIDs [4, 5] may be assigned for APs on other links, such that the first set of values on Link3 is [0, 5]. In some embodiments, the first set of values may exclude the AIDs assigned for APs on the links included in the multi-link setup (e.g., AIDs [0, 4] and [0, 5]) for the assignment to a non-AP MLD. Therefore, in such an embodiment, an AID with a range from 6 to N can be assigned to the non-AP MLD, such that N is the maximum allowed AID value that may be assigned.

In some embodiments, for an AP MLD, a DTIM interval for APs affiliated with the AP MLD on a first set of links may be the same, such that "the same" may be defined as the difference between DTIM intervals on different links being less than a predetermined threshold. In such an embodiment, for each AP affiliated with the AP MLD, there may be two indications included in a Beacon frame. For example, a first indication may include information on a Beacon Interval indicating time between TBTT or Target Short Beacon Transmission Time (TSBTT). As another example, a second indication may include information on a DTIM Period indicating the number of Beacon intervals or short Beacon intervals between successive DTIMs. In one embodiment, the difference of the multiplication of the Beacon Interval and the DTIM Period for different APs affiliated with the AP MLD on the first set of links may be within a predetermined value (e.g., the predetermined value may be zero). In another embodiment, the difference of the DTIM Period for different APs affiliated with the AP MLD on the first set of links may be within a predetermined value (e.g., the predetermined value may be zero).

In some embodiments, when the predetermined value is zero, the multiplication of the Beacon Interval and the DTIM Period of each AP affiliated with the AP MLD may be the same. In such an embodiment, a Beacon Interval field in a Beacon frame may represent the information on the Beacon Interval. In such an embodiment, a DTIM Period field in a TIM element of the Beacon frame may represent the information on the DTIM Period. In some embodiments, the AP MLD operates on a second set of links and the first set of links may be a subset of the second set of links, such that the Beacon frame may be transmitted on the first set of links. In such an embodiment, non-AP MLDs can monitor TIM and/or DTIM information of the AP MLD on the first set of links. In addition, in such an embodiment, the AP MLD may not transmit a Beacon frame on a third set of links, such that the third set of links may be a subset of the second set of links, and such that each link within the third set of links may not be a link within the first set of links.

In some embodiments, if a set of group addressed frames is buffered at an AP affiliated with an AP MLD on a link, then the AP may transmit the set of group addressed frames at predetermined times in consecutive DTIM intervals. As an example, in each DTIM interval within the consecutive DTIM intervals, the set of group addressed frames may be transmitted from the AP once. In such an embodiment, there may be an indication in a DTIM Beacon frame within the consecutive DTIM intervals that indicates group addressed frames are buffered at the AP affiliated with the AP MLD. In some embodiments, within each DTIM interval within the consecutive DTIM intervals, if the set of group addressed frames is transmitted from the AP and no more group addressed frames are to be transmitted from the AP, a More Data subfield on the last group addressed frame to be transmitted during the DTIM interval may be set to zero. In such an embodiment, each group addressed frame transmitted by the AP may include an indication that indicates whether or not the AP's transmission may be the last transmission.

Figure 5:
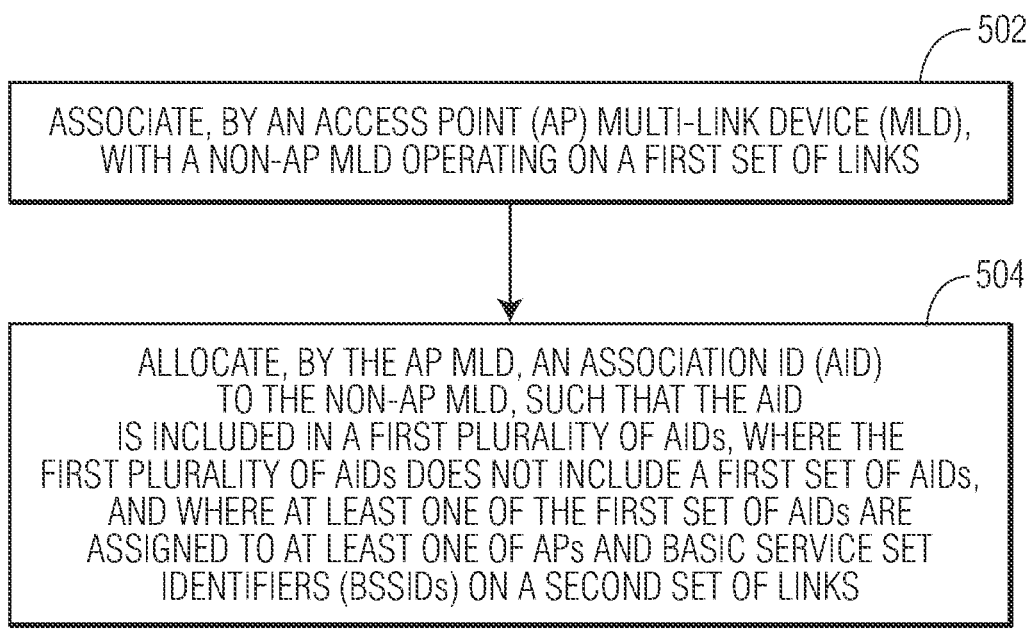
FIG. 5 illustrates a flow diagram of a technique for multi-link communications in accordance with an embodiment of the invention.

FIG. 5 illustrates a flow diagram of a technique for multi-link communications in accordance with an embodiment of the invention. At block 502, an AP MLD associates with a non-AP MLD operating on a first set of links. At block 504, the AP MLD allocates an AID to the non-AP MLD, such that the AID is included in a first plurality of AIDs, where the first plurality of AIDs does not include a first set of AIDs, and where at least one of the first set of AIDs are assigned to at least one of APs and BSSIDs on a second set of links.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An access point (AP) multi-link device (MLD), the AP MLD comprising:
a processor configured to,
associate the AP MLD with a non-AP MLD operating on a first set of links;
allocate an Association ID (AID) to the non-AP MLD, such that the AID is included in a first set of AIDs,
wherein the first set of AIDs does not include a second set of AIDs,
wherein at least one of the second set of AIDs are assigned to at least one of APs and Basic Service Set Identifiers (BSSIDs) on a second set of links;
wherein AIDs assigned to at least one non-AP MLD are unique and set to a value greater than at least 2n; and
wherein n is a maximum value of log 2 (maximum possible number of BSSIDs) amongst multiple BSSID sets operating on each link of the AP MLD.

2. The AP MLD of claim 1,
wherein the second set of links are the same as the first set of links.

3. The AP MLD of claim 1,
wherein the second set of links are a set of links on which the AP MLD is operating.

4. The AP MLD of claim 1,
wherein a set of bits in a Traffic Indication Map (TIM) element transmitted in a management frame from an AP affiliated with the AP MLD on a first link corresponds to the second set of AIDs, and
wherein the second set of AIDs are assigned to APs corresponding to a non-transmitted BSSID and APs affiliated with the AP MLD on at least one link that is not the first link.

5. The AP MLD of claim 1,
wherein an AP affiliated with the AP MLD explicitly indicates information that identifies which AID is assigned for each AP affiliated with the AP MLD in a management frame.

6. The AP MLD of claim 5,
wherein the management frame includes a Multi-Link (ML) element to indicate the AID for each AP affiliated with the AP MLD.

7. The AP MLD of claim 5,
wherein a first field is defined in a Common Info field of a Basic variant ML element to indicate information for AIDs that correspond to each AP affiliated with the AP MLD.

8. The AP MLD of claim 5,
wherein the management frame includes a Reduced Neighbor Report (RNR) element to indicate the AID for each AP affiliated with the AP MLD.

9. The AP MLD of claim 1,
wherein an AP affiliated with the AP MLD implicitly indicates information that identifies which AID is assigned for each AP affiliated with the AP MLD in a management frame.

10. The AP MLD of claim 9,
wherein a set of bits in a TIM element transmitted in the management frame correspond to a predetermined range of AIDs and indicate which APs affiliated with the AP MLD have buffered group addressed frames.

11. The AP MLD of claim 10,
wherein the AP corresponds to at least one of not part of a multiple BSSID set and part of the multiple BSSID set which is a transmitted BSSID, and
wherein the AP indicates which APs affiliated with the AP MLD have buffered group addressed frames via a set of contiguous bits in a Partial Virtual Bitmap field of the TIM element after a last bit corresponding to a non-transmitted BSSID that is in the same multiple BSSID as the AP.

12. The AP MLD of claim 10,
wherein the AP corresponds to a non-transmitted BSSID in a multiple BSSID set, and
wherein another AP corresponding to a transmitted BSSID in the same multiple BSSID set indicates which APs in the same AP MLD as the AP have buffered group addressed frames via a set of contiguous bits in a Partial Virtual Bitmap field of the TIM element after a last bit corresponding to the non-transmitted BSSID that is in the same multiple BSSID as the AP.

13. The AP MLD of claim 10,
wherein a first AP affiliated with the AP MLD is not part of a multiple BSSID, and
wherein AIDs [1, N] are assigned to APs affiliated with the AP MLD and which do not include the first AP.

14. The AP MLD of claim 10,
wherein a first AP affiliated with the AP MLD is operating on a first link and corresponds to a transmitted BSSID in a multiple BSSID set, and
wherein AIDs [1, 2n−1] are assigned to APs corresponding to non-transmitted BSSID operating on the first link and AIDs [2n, 2n+N] are assigned to APs affiliated with the AP MLD and which do not include the first AP.

15. The AP MLD of claim 14,
wherein a second AP affiliated with a second AP MLD is operating on the first link and corresponds to a non-transmitted BSSID in the multiple BSSID set, and
wherein AIDs [2n+N+1, 2n+N+M] are assigned to APs affiliated with the second AP MLD and which do not include the second AP.

16. The AP MLD of claim 1,
wherein an AP affiliated with the AP MLD corresponds to at least one of not part of a multiple BSSID set and part of the multiple BSSID set which is a transmitted BSSID;
wherein the AP indicates which other APs in the same AP MLD have buffered group addressed frames via a set of bits in a Partial Virtual Bitmap field of a TIM element after a last bit corresponding to a non-transmitted BSSID in the same multiple BSSID as the AP; and
wherein the AP transmits a Delivery TIM (DTIM) Beacon that includes the indication which is based on information corresponding to other APs that the AP has when the AP schedules the DTIM Beacon.

17. The AP MLD of claim 1,
wherein an AP affiliated with the AP MLD corresponds to a non-transmitted BSSID in a multiple BSSID set;
wherein the AP corresponds to a transmitted BSSID in the same multiple BSSID set that indicates which other APs in the same AP MLD as the non-transmitted BSSID have buffered group addressed frames via a set of bits in a Partial Virtual Bitmap field of a TIM element after a last bit corresponding to a non-transmitted BSSID in the same multiple BSSID as the AP; and
wherein the AP that corresponds to the transmitted BSSID of the same multiple BSSID set as the non-transmitted BSSID transmits a DTIM Beacon that includes the indication corresponding to the non-transmitted BSSID and which is based on information corresponding to other APs that the transmitted BSSID has when the AP schedules the DTIM Beacon.

18. The AP MLD of claim 1,
wherein the AP MLD and the non-AP MLD are compatible with an Institute of Electrical and Electronics Engineers (IEEE) 802.11 protocol.

19. An access point (AP) multi-link device (MLD), the AP MLD comprising:
a processor configured to:
associate with a non-AP MLD operating on a first set of links;
allocate an Association ID (AID) to the non-AP MLD, such that the AID is included in a first set of AIDs,
wherein the first set of AIDs does not include a second set of AIDs,
wherein at least one of the second set of AIDs are assigned to at least one of APs and Basic Service Set Identifiers (BSSIDs) on a second set of links;
wherein an AP affiliated with the AP MLD implicitly indicates information that identifies which AID is assigned for each AP affiliated with the AP MLD in a management frame;
wherein a set of bits in a Traffic Indication Map (TIM) element transmitted in the management frame correspond to a predetermined range of AIDs and indicate which APs affiliated with the AP MLD have buffered group addressed frame;
wherein a first AP affiliated with the AP MLD is not part of a multiple BSSID; and
wherein AIDs [1, N] are assigned to APs affiliated with the AP MLD and which do not include the first AP.

20. An access point (AP) multi-link device (MLD), the AP MLD comprising:
a processor configured to:
associate with a non-AP MLD operating on a first set of links;
allocate an Association ID (AID) to the non-AP MLD, such that the AID is included in a first set of AIDs;
wherein the first set of AIDs does not include a second set of AIDs;
wherein at least one of the second set of AIDs are assigned to at least one of APs and Basic Service Set Identifiers (BSSIDs) on a second set of links;
wherein an AP affiliated with the AP MLD implicitly indicates information that identifies which AID is assigned for each AP affiliated with the AP MLD in a management frame;
wherein a set of bits in a Traffic Indication Map (TIM) element transmitted in the management frame correspond to a predetermined range of AIDs and indicate which APs affiliated with the AP MLD have buffered group addressed frame;
wherein the AP corresponds to at least one of not part of a multiple BSSID set and part of the multiple BSSID set which is a transmitted BSSID; and
wherein the AP indicates which APs affiliated with the AP MLD have buffered group addressed frames via a set of contiguous bits in a Partial Virtual Bitmap field of the TIM element after a last bit corresponding to a non-transmitted BSSID that is in the same multiple BSSID as the AP.

* * * * *